US010198809B2

(12) United States Patent
Schweid et al.

(10) Patent No.: US 10,198,809 B2
(45) Date of Patent: *Feb. 5, 2019

(54) SYSTEM AND METHOD FOR DEFECT DETECTION IN A PRINT SYSTEM

(71) Applicant: Xerox Corporation, Norwalk, CT (US)

(72) Inventors: Stuart Schweid, Pittsford, NY (US); Douglas R. Taylor, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/487,584

(22) Filed: Apr. 14, 2017

(65) Prior Publication Data

US 2018/0225815 A1  Aug. 9, 2018

Related U.S. Application Data

(60) Provisional application No. 62/455,731, filed on Feb. 7, 2017.

(51) Int. Cl.
*G06K 9/62* (2006.01)
*G06T 7/00* (2017.01)

(52) U.S. Cl.
CPC ............... *G06T 7/001* (2013.01); *G06K 9/62* (2013.01); *G06K 9/6202* (2013.01); *G06K 9/6267* (2013.01); *G06T 2207/10008* (2013.01); *G06T 2207/20036* (2013.01); *G06T 2207/30144* (2013.01); *G06T 2207/30168* (2013.01)

(58) Field of Classification Search
None
See application file for complete search history.

(56) References Cited

U.S. PATENT DOCUMENTS

| 6,078,051 | A | 6/2000 | Banton et al. |
| 6,122,393 | A | 9/2000 | Schweid et al. |
| 6,198,835 | B1 | 3/2001 | Banton et al. |
| 6,246,781 | B1 | 6/2001 | Schweid et al. |
| 6,252,680 | B1 | 6/2001 | Schweid et al. |
| 6,718,053 | B1 * | 4/2004 | Ellis ................... G01N 15/1475 345/604 |

(Continued)

OTHER PUBLICATIONS

Wang, Z. et al., "Image Quality Assessment: From Error Visibility to Structural Similarity", IEEE Transactions on Image Processing, vol. 13, No. 4, Apr. 2004.

*Primary Examiner* — Delomia L Gilliard
(74) *Attorney, Agent, or Firm* — Fox Rothschild LLP

(57) ABSTRACT

A system for detecting defects in a print system may include a print engine to print an electronic document (a reference image) and yield a printed document. The system may also include an image sensor to scan the printed document into a scanned electronic document (a target image). The system may include a processing device to detect defects in the printed document by analyzing the activity level in the reference and target image. The system may identify a quiet area/pixel in the reference image based on the activity level, check the activity level of the corresponding pixel in the target image, and classify the pixel in the target image as defective if the activity level of the pixel in the target image exceeds a noise threshold. The system may additionally swap the reference and target image, repeat the detection steps and combine the detection results with those before the swap.

28 Claims, 5 Drawing Sheets

(56) References Cited

U.S. PATENT DOCUMENTS

| | | | |
|---|---|---|---|
| 7,483,591 B2* | 1/2009 | Schweid | H04N 1/00681 |
| | | | 358/488 |
| 8,090,215 B2* | 1/2012 | Schweid | G06K 9/40 |
| | | | 348/666 |
| 8,332,176 B2 | 12/2012 | Custode et al. | |
| 2005/0037406 A1* | 2/2005 | De La Torre-Bueno | |
| | | | G01N 21/6428 |
| | | | 435/6.12 |
| 2011/0069894 A1* | 3/2011 | Vans | G06K 9/036 |
| | | | 382/218 |

* cited by examiner

SYSTEM AND METHOD FOR DEFECT DETECTION IN A PRINT SYSTEM

RELATED APPLICATIONS

This patent document claims priority to U.S. Provisional Patent Application No. 62/455,731 filed Feb. 7, 2017, the disclosure of which is incorporated herein by reference in full.

BACKGROUND

This disclosure relates to print and image systems and in particular to detecting defects in images and printed documents.

In a print system there are common defects that may occur in printed documents. These defects include, for example, image streaking, image banding, excessive graininess, small area deletions and large area deletions. Some existing systems for detecting the defects compare the image of the original electronic document to be printed (reference image) with the image of the printed document (target image) to determine if any differences exist. Some comparison methods are either based on global comparison models, such as SIFT, histogram comparisons and feature vectors, or based on pixel by pixel local differences, such as Structural Similarity Index (SSIM). However, none of these methods can effectively detect the defects in printed documents where the differences between the reference image and the target image are small, colors vary between the reference image and target image, or image alignment between the two is not perfect. For example, some existing methods that compare gray levels between the reference and target images do not perform well given the difficulty of accurately matching the colors. There are also similar issues in detecting defects in an image system, such as detecting defects in a printed or processed image.

This document describes systems and methods that are intended to address at least some issues discussed above and/or other issues.

SUMMARY

In some embodiments, a system for detecting defects in a print system may include a print engine configured to print a first electronic document to yield a printed document. The system may also include an image sensor configured to scan the printed document into a second electronic document. The system may include a processing device. The system may also include a non-transitory, computer-readable medium containing programming instructions that are configured to cause the processing device to detect defects in the printed document. In some embodiments, the system may obtain a reference image comprising content of a page of the first electronic document, and obtain a target image comprising content of a page of the second electronic document.

The system may analyze the reference image to determine a first activity matrix comprising activity levels for a plurality of pixels of the reference image, and analyze the target image to determine a second activity matrix comprising activity levels for a plurality of pixels in the target image. The system may use the first activity matrix to classify one or more pixels in the reference image as corresponding to a quiet area, which denotes an area in which a pixel and its neighboring pixels exhibit less than a threshold level of activity. For at least a subset of the pixels in the reference image that correspond to the quiet area, the system may compare each pixel in the subset to a corresponding pixel in the target image to determine whether a difference between the activity level of each pixel in the subset and the activity level of the corresponding pixel in the target image exceeds a noise threshold. For any reference image pixel and corresponding target image pixel, for which the difference of activity level exceeds the noise threshold, the system may classify that target image pixel as defective. The system may further determine a defect detection map that comprises each of the target pixels that were classified as defective.

In determining the first activity matrix, the system may calculate a standard deviation for each of the pixels in the reference image using a first low-pass filter Similarly, in determining the second activity matrix, the system may calculate a standard deviation for each of the pixels in the target image using a second low-pass filter. In some embodiments, the first low-pass and the second low-pass filters are a two-dimensional window comprising a plurality of coefficients having equal values.

In some embodiments, in classifying the one or more pixels in the reference image as corresponding to a quiet area, the system may determine that the activity levels of the one or more pixels in the reference image are below a first threshold. In determining that the difference of activity level exceeds the noise threshold, the system may determine that the activity level of each corresponding pixel in the target image is above a first threshold, and that a ratio of the activity level of each corresponding pixel in the target image over the activity level of each pixel of the subset in the reference image is above a second threshold.

In some embodiments, the system may perform a morphological dilation on the first activity matrix to update the first activity matrix, and/or perform a morphological erosion on the second activity matrix to update the second activity matrix, before classifying the pixels in the reference image and the target image. The morphological dilation can be a gray-scale dilation and the morphological erosion can also a gray-scale erosion. The system may also connect one or more defective pixels in the defect detection map into one or more connected components. In connecting the one or more defective pixels in the defect detection map, the system may perform a morphological closing on the defect detection map. Alternatively, and/or additionally, the system may further include a morphological opening on the defect detection map. The system may also identify from the one or more connected components in the defect detection map a largest connected component. The system may also determine a confidence level to defect detection based on the size of the largest connected component.

In some embodiments, the system may perform the same detection steps as disclosed above and repeat these steps with the reference and target image swapped. In each round performing the above steps, before and after the swapping, the system generates a defect detection map that includes target image pixels that were classified as defective. The system may combine the defect detection map from each round of detection so that all of the target image pixels that were classified as defective in either round may be classified as defective in the combined defect detection map. Similar to above illustrated embodiments in defect detection, the system may also connect one or more defective pixels in the combined defect detection map into one or more connected components. In connecting the one or more defective pixels in the defect detection map, the system may perform a morphological closing on the defect detection map. Alternatively, and/or additionally, the system may further include a morphological opening on the defect detection map. The system may also identify from the one or more connected components in the combined defect detection map a largest connected component. The system may also determine a confidence level to defect detection based on the size of the largest connected component.

Alternatively, and/or additionally, the system may determine a horizontal and vertical activity matrix separately in a similar manner as described above and combine the results. In some embodiments, the system may analyze the reference image to determine a first horizontal activity matrix comprising horizontal activity levels for a plurality of pixels of the reference image, and analyze the target image to determine a second horizontal activity matrix comprising horizontal activity levels for a plurality of pixels in the target image. The system may also use the first horizontal activity matrix to classify a first set of pixels comprising one or more pixels in the reference image as corresponding to a quiet area, which denotes an area in which a pixel and its neighboring pixels exhibit less than a threshold level of activity. For at least a subset of the first set of pixels in the reference image that correspond to the quiet area, the system may compare each pixel in the subset of the first set of pixels to a corresponding pixel in the target image to determine whether the difference between the horizontal activity level of each pixel in the subset and the horizontal activity level of the corresponding pixel in the target image exceeds a noise threshold. For any reference image pixel and corresponding target image pixel, for which the difference of horizontal activity level exceeds the noise threshold, the system may classify that target image pixel as defective.

Alternatively, and/or additionally, the system may analyze the reference image to determine a first vertical activity matrix comprising vertical activity levels for a plurality of pixels of the reference image, and analyze the target image to determine a second vertical activity matrix comprising vertical activity levels for a plurality of pixels in the target image. The system may also use the first vertical activity matrix to classify a second set of pixels comprising one or more pixels in the reference image that, based on their activity levels, as corresponding to a variation area. For at least a subset of the second set of pixels in the reference image that correspond to the variation area, the system may compare each pixel in the subset of the second set of pixels to a corresponding pixel in the target image to determine whether the difference between the vertical activity level of each pixel in the subset and the vertical activity level of the corresponding pixel in the target image exceeds a noise threshold. For any reference image pixel and corresponding target image pixel, for which the difference of vertical activity level exceeds the noise threshold, the system may classify that target image pixel as defective. In some embodiments, the system may determine a combined defect detection map that comprises all of the target image pixels that were classified as defective based on the horizontal activity matrix and the vertical activity matrix.

Various features in detecting defects based on a single activity matrix described above also apply to detecting defects based on horizontal activity matrix combined with vertical activity matrix. Additionally, in some embodiments, the system may perform the same detection steps as disclosed above that are based on the horizontal activity matrix and the vertical activity matrix, and repeat these steps with the reference and target image swapped. In each round performing the above steps, before and after the swapping, the system may generate a defect detection map that includes target image pixels that were classified as defective. The system may combine the defect detection map from each round of detection so that all of the target image pixels that were classified as defective in either round may be classified as defective in the combined defect detection map.

Similar to above illustrated embodiments in defect detection, for the combined defect detection map that was obtained based on the defect detection map determined before and after the swap of the reference and target image, the system may also connect one or more defective pixels in the combined defect detection map into one or more connected components. In connecting the one or more defective pixels in the defect detection map, the system may perform a morphological closing on the defect detection map. Alternatively, and/or additionally, the system may further include a morphological opening on the defect detection map. The system may also identify from the one or more connected components in the combined defect detection map a largest connected component. The system may also determine a confidence level to defect detection based on the size of the largest connected component.

DETAILED DESCRIPTION

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to."

The terms "memory," "computer-readable medium" and "data store" each refer to a non-transitory device on which computer-readable data, programming instructions or both are stored. Unless the context specifically states that a single device is required or that multiple devices are required, the terms "memory," "computer-readable medium" and "data store" include both the singular and plural embodiments, as well as portions of such devices such as memory sectors.

Each of the terms "dilation," "erosion," "opening," "closing," or "morphological dilation," "morphological erosion,"

"morphological opening" and "morphological closing" refers to a corresponding term in mathematical morphological operations.

Figure 1:
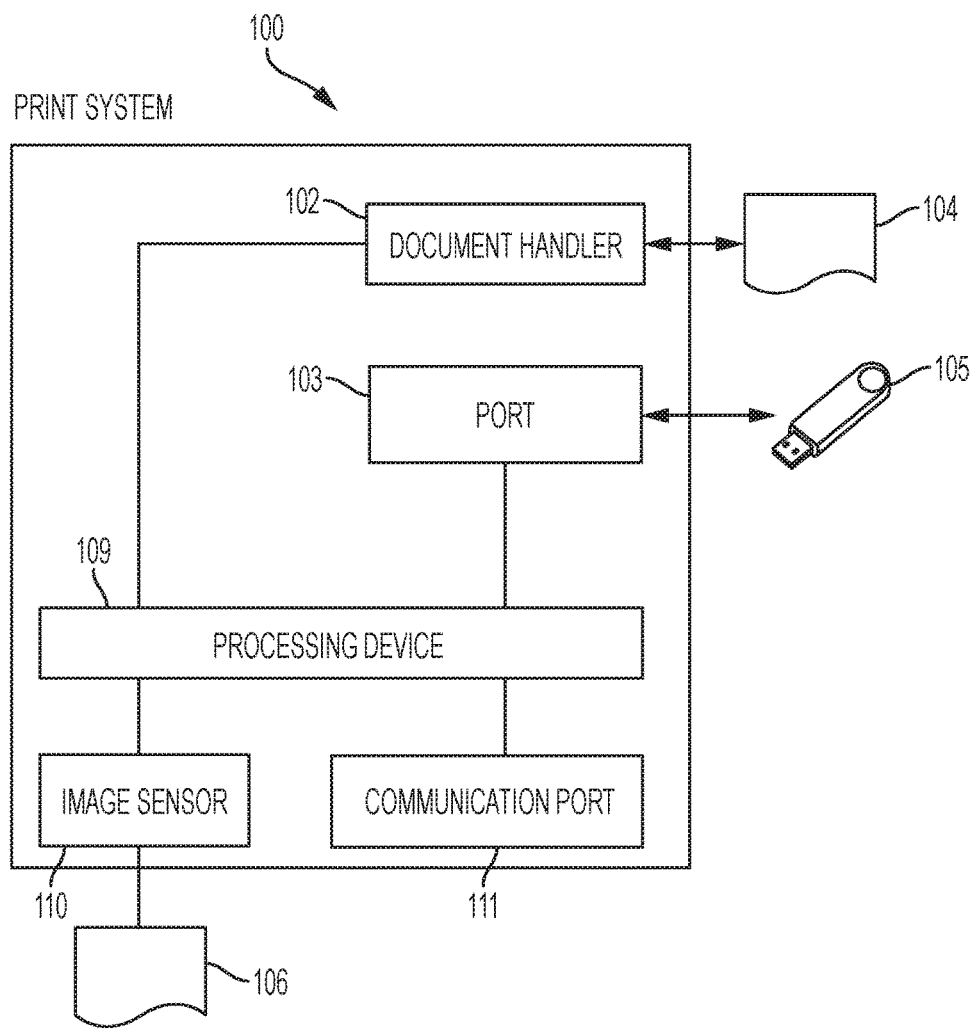
FIG. 1 depicts a print system according to some embodiments.

In FIG. 1, in some embodiments, a print system 100 may include a processing device 109 that is configured to accomplish various conventional printing, scanning or other tasks as available in a multi-function peripheral (MFP). The print system may also include a document handler 102 for automatically scanning one or more print documents 104 into electronic representations, e.g. electronic document files. The print system may also include a port 103 that is configured to receive a digital media storage device 105, e.g. a USB drive, and retrieve/write data from/to the digital media storage device. The print system may also include a communication port 111 that is configured to be communicatively connected with one or more electronic devices or data servers via a communication link, e.g. Wi-Fi, Bluetooth, Infrared or other known or later developed communication protocols, wired or wirelessly.

The print system 100 may be configured to generate one or more printed documents 106 from corresponding electronic documents, e.g. a PDF file, a Microsoft Word or a document file in other electronic forms. The content of a page of a printed document ought to duplicate the content of the electronic document to be printed. However, depending on the performance of the print system, the printed document may not be a perfect mirror of the corresponding electronic document, and the printed document may have defects. Examples of printing defects include image streaking, image banding, excessive graininess, small area deletions and large area deletions, or other artifacts.

In some embodiments, the print system 100 may include an image sensor 110, which can be configured to scan a page of a printed document into an electronic document. The system may be configured to analyze the electronic document in order to determine if the printed document has any defects. In some embodiments, the image sensor may be a scan bar installed on the print system and controlled by the processing device to scan a printed document before the printed document is placed on an output tray of the print system. In some embodiments, the image sensor may be installed separately from the print system, such as part of a separate scanning device. The image sensor may be configured to scan the printed document either automatically, or manually by prompting the user to scan the printed document for checking for defects. In some embodiments, an image system may have similar structures as embodiments shown in FIG. 1. In some embodiments, instead of using a print engine to print an electronic document or using an image sensor to scan a printed document, the image system may obtain a reference image representing the electronic document from a storage device, a data store or a remote service via a communication port. Alternatively, and/or additionally, the image system may also obtain a target image representing a scanned electronic document of a printed document that is printed and/or scanned elsewhere, for example, at a remote location or in a different system. Programming instructions for detecting defects can be executed by the processing device onboard the print system or image system, or executed by a remote device or a server on a cloud. The details of detecting defects in a printed document are further described with reference to FIG. 2.

Various embodiments described in this document are applicable to both print systems and image systems. For example, in FIG. 2, according to some embodiments, a system for detecting defects in a printed document may obtain a reference image 202 and obtain a target image 204.

The reference image includes the content of a page of an electronic document to be printed. The target image includes the content of a page of an electronic document that corresponds to the printed document, which has been scanned into the electronic form by the image sensor. In some embodiments, the system looks for image variations (e.g. edges, thin lines, bands) in areas in the printed document where the corresponding area in the original electronic document (or reference image) is smooth. Limiting the search for variation to just smooth areas of the reference image ensures insensitivity to mis-registration between reference and target images, which may be on the order of several pixels.

In some embodiments, in looking for image variations or smooth areas in the reference image or target image, the system may determine an activity matrix for the image, where the activity matrix includes the activity levels for one or more pixels in the image. In some embodiments, the method calculates the activity matrix of an image by applying a filter $F(x,y)$ to the image as below:

$$A(x,y)=[\{I(x,y)\}^2 \hat{\times} F(x,y) - \{I(x,y)\}^2 \hat{\times} F(x,y)\}^2]^{0.5} \quad (1)$$

where the filter $I(x,y)$ is the image, $F(x,y)$ is the filter, and $A(x,y)$ is the filtered image. In some embodiments, $F(x,y)$ may satisfy $\Sigma_x \Sigma_y F(x,y)=1$ and $F(x,y)>=0 \forall xy$. Jensen's inequality ensures that the resulting calculation is positive, allowing a square root to be taken. In some embodiments, $F(x,y)$ may be symmetric about both the x and y axis, i.e. $F(-x,y)=F(x,y)$ and $F(x,-y)=F(x,y)$. In some embodiments, $F(x,y)$ also may be a separable filter in terms of x and y.

In some embodiments, the filter $F(x,y)$ can be a standard deviation of the image at every pixel using a neighborhood around the pixel. The standard deviation pixel by pixel can be calculated using the variance calculation represented by:

$$\sigma^2 = E\{x^2\} - E\{x\}^2$$

In some embodiments, the activity matrix can be calculated by using a Rect filter, and the activity level of each pixel in image $I(x,y)$ can be expressed by:

$$\sigma(x,y)=[\{I(x,y)\}^2 \hat{\times} \text{Rect}(x/x_0, y/y_0)/(x_0 \bullet y_0) - \{I(x,y)\}^2 \hat{\times} \text{Rect}(x/x_0, y/y_0)/(x_0 \bullet y_0)\}^2]^{0.5}$$

where $(x_0, y_0)$ represents the size of the window for the filter Rect. This reduces the calculation of standard deviation to a simple set of (operable) filtering operations and squaring operations. In some embodiments, the Rect filter is a low-pass filter. In some embodiments, the Rect filter may be a two-dimensional window that includes multiple coefficients having equal values that are non-negative. In some embodiments, the sum of coefficients in the Rect filter may be 1.0.

In some embodiments, the filter $F(x,y)$ can be other types of filters. For example, it can be a filter that can simultaneously "descreens" the image (i.e. remove the halftone) as well as decreases the effect of any scanner modulation transfer function (MTF).

Returning to FIG. 2, in some embodiments, the system may determine the activity matrix for the reference image 206 and determine the activity matrix for the target image 208. The system may use the same or different filters for the reference image and the target image. For example, the Rect filter for both reference image and target image may be of size 13×13 or 15×15, having all coefficients of equal values.

Returning to FIG. 2, the system may use the activity matrix of the reference image and that of the target image to classify one or more defective pixels in the target image. In some embodiments, the system may classify a pixel in the target image defective when the corresponding pixel in the reference image has no activity or corresponds to a quiet area (i.e. the activity level value is below a threshold level of activity) while the pixel in the target image has a significant activity. In some embodiments, the system may classify a pixel as corresponding to a quiet area 211. The quiet area denotes an area in which a pixel and its neighboring pixels exhibit less than a threshold level of activity. In a non-limiting example, the threshold level of activity may depend on the scanner MTF. For example, if the gray scale of the image ranges between 0 and 255, the threshold level of activity may be 3.0. In other words, if the activity level of a pixel in the image is below 3.0, the system may classify that pixel as corresponding to a quiet area.

In some embodiments, the system may determine the difference between activity level of each pixel in the target image and the activity level of the corresponding pixel in the reference image 213. If the difference exceeds a noise threshold 215, the system may classify the pixel in the target image as defective 218. The system may check for a subset of pixels or all pixels in the target image that correspond to the quiet area in the reference 214 until all pixels have been processed 216. In some embodiments, in determining the difference between the activity levels in the target image and reference image exceeds a noise threshold, the system may determine whether the activity level of the pixel in the target image is above a variation threshold of activity level, which may be a preset value or may depend on the scanner MTF. For example, if the gray scale of the image ranges between 0 and 255, the variation threshold of activity level may be 3.0. In other words, if the activity level of a pixel in the target image that corresponds to a quiet area in the reference image is above 3.0, then system may classify that pixel in the target image as defective.

In some embodiments, in determining the difference between activity levels in the target image and reference image exceeds a noise threshold, the system may alternatively or additionally determine whether the ratio of the activity level of each corresponding pixel in the target image over the activity level of each pixel in the reference image is above a ratio threshold. If the ratio is above the ratio threshold, the system may classify that pixel in the target image as defective. In some embodiments, the ratio threshold may be a predetermined value, or may be dynamically determined depending on the scanner MTF. For example, if the gray scale of the image ranges between 0 and 255, the ratio threshold of activity level may be 2.0. In other words, if the ratio of activity level of a pixel in the target image over the activity level of the corresponding pixel in the reference image is above 2.0, the system may classify the target image pixel as defective. In some embodiments, the system may select the threshold level of activity, the variation threshold, and/or the ratio threshold depending on the scanner MTF and the residual noise when descreening the printed image with the filter (e.g. F(x,y)).

Optionally, in some embodiments, the system may reduce the sensitivity to misalignment between the reference image and the target image before determining the difference between the activity levels of the two images in step 213. In some embodiments, the system may apply morphological operations to both activity matrices for the reference image and the target image. For example, the system may perform a dilation on the activity matrix of the reference image and update the activity matrix 210 before classifying the pixels in the reference image. This effectively finds the most active area of the reference image in a context larger than the filter used to calculate the activity matrix. In some embodiments, the system may perform a gray dilation on the activity matrix of the reference image, in which the maximum value of every area grows out into its neighbors defined by the structuring element of the dilation operation.

Alternatively, and/or additionally, the system may also perform gray erosion on the activity matrix of the target image 212 and update the activity matrix of the target image before classifying the pixels in the target image. This erosion chooses the lowest activity area in a context around the current pixel. If the most active area of the image is very near the current pixel (which is often true for a defect), then the erosion operation will provide a result similar to finding activity in an area that is the intersection of the neighborhoods used to calculate the activity measure. It is therefore important that the structuring element of erosion has a context less than the context size of the filter, F(x,y), used to calculate the activity matrix. If not, there is no overlapping area (no pixel is used in all calculation) and the method just results in finding the quietest area which will never include a small localized defect. Conversely, the structuring element must be large enough to encompass the largest possible misalignment between the reference and target images. In some embodiments, the filter F(x,y) may have a 15×15 context size and an erosion structuring element may have a 9×9 context size.

Figure 2:
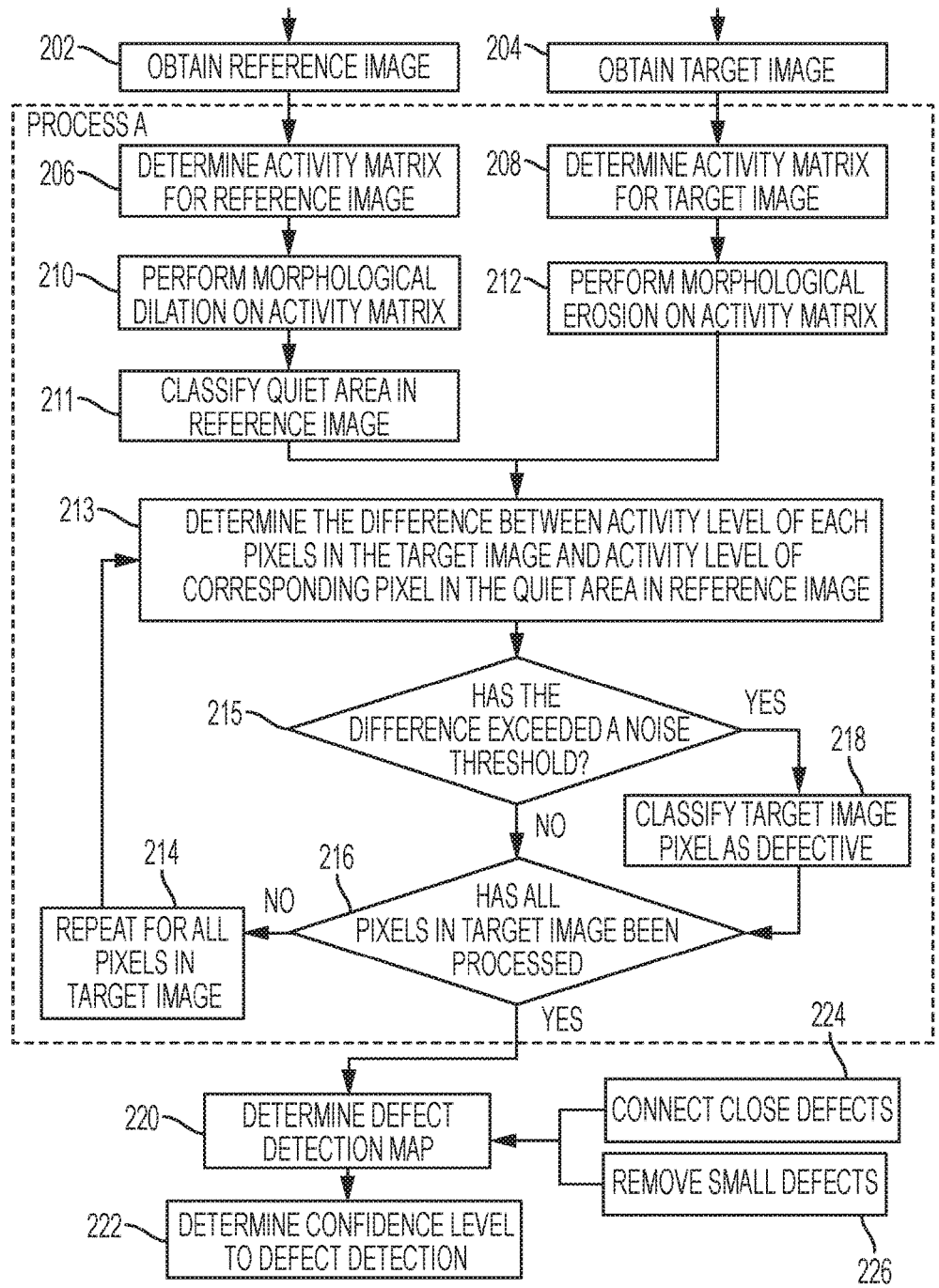
FIG. 2 depicts a diagram of a process of detecting defects in a print system according to various embodiments.

With further reference to FIG. 2, upon detecting the defective pixels in the target image, the system may determine a defect detection map 220 which includes all of the classified defective pixels in the target image. In some embodiments, the defect detection map may be a binary image, in which each value indicates whether or not each pixel is defective. Additionally, in some embodiments, the system may connect close defects 224 and/or remove small defects 226 in the defect detection map.

In some embodiments, the system may connect one or more defective pixels in the defect detection map into one or more connected components. For example, the system may apply a morphological closing operation (dilation followed by erosion) on the defect detection map, which results in an updated defect detection map, in which detected defective areas that are close to each other are connected. The morphological closing involves a dilation followed by an erosion, and the structuring elements for the dilation and erosion may be the same or different. For example, in some embodiments, the dilation may use a structuring element of a size 20, whereas the erosion may use a structure element of a size 11×11 or 13×13. In some embodiments, the morphological closing may be a binary operation when the defect detection map is binary.

Alternatively, and/or additionally, the system may remove small defects in the defect detection map 226. For example, the system may use a morphological opening (erosion followed by dilation) to remove small defects. The system may also use other methods, such as finding all connected components in the defect detection map and removing the connected components whose sizes are below a certain threshold.

Returning to FIG. 2, in some embodiments, the system may determine a confidence level for the defect detection map 222. In a non-limiting example, the system may analyze the post-closing defect detection map (from step 224) using a connected component analysis. The system may determine all or a subset of connected components in the defect detection map, identify the size of each connected component, and identify the largest single connected component. In some embodiments, the system may determine a bounding box for each connected component, and the size of the connected component may be measured in width and/or height of the bounding box. Based on the largest dimension of all of the bounding boxes, the system may compute a confidence level of a defect (e.g. streak or band). In some embodiments, the confidence level may increase when the size of the largest connected component is above a threshold size.

In some embodiments, the system may report the result of defect detection to the user. For example, the system may overlay the bounding boxes of connected components from the defect detection map on the scanned version of the printed document to indicate to the user the locations of suspected defects. The system may display the overlaid results on a display of the print system. The system may also transmit the overlaid result indicating the locations of suspected defects to a remote electronic device of a user. The system may also print a hardcopy document showing the locations of the suspected defects of the printout. The system may also display or report the confidence level to the defect detection to the user. This reporting allows the user to be able to determine whether the printed document is acceptable, and to determine whether to reject the printed image or initiate printer maintenance. Alternatively, and/or additionally, the system may use the defect detection results and the confidence level to make the recommendation automatically. For example, if the number of connected components from the defect detection map exceeds a threshold and/or the confidence level exceeds a confidence threshold, the system may determine to reject the printed document or initiate printer maintenance. In another example, if the number of connected components from the defect detection map is below a threshold and/or the confidence level is below a confidence threshold, the system may determine to accept the printed document.

The above illustrated embodiments essentially look for defects in areas where the reference image had little or no activity. Alternatively, and/or additionally, the system may look for activity in a particular direction in the target image that does not exist in the reference image. For example, if the reference image has horizontal edges but no vertical edges in a local context it is advantageous for the system to look for vertical edges in the target image in that context rather than ignoring that area completely. In some embodiments, the system may accomplish this by filtering the image in one direction (e.g. just a vertical filter N×1) and then calculating the standard deviation or activity matrix using a filter in the perpendicular direction (e.g. a horizontal filter 1×M). The system may determine both horizontal and vertical defects independently and merge the results. The details of the embodiments are further described with reference to FIG. 3.

Figure 3:
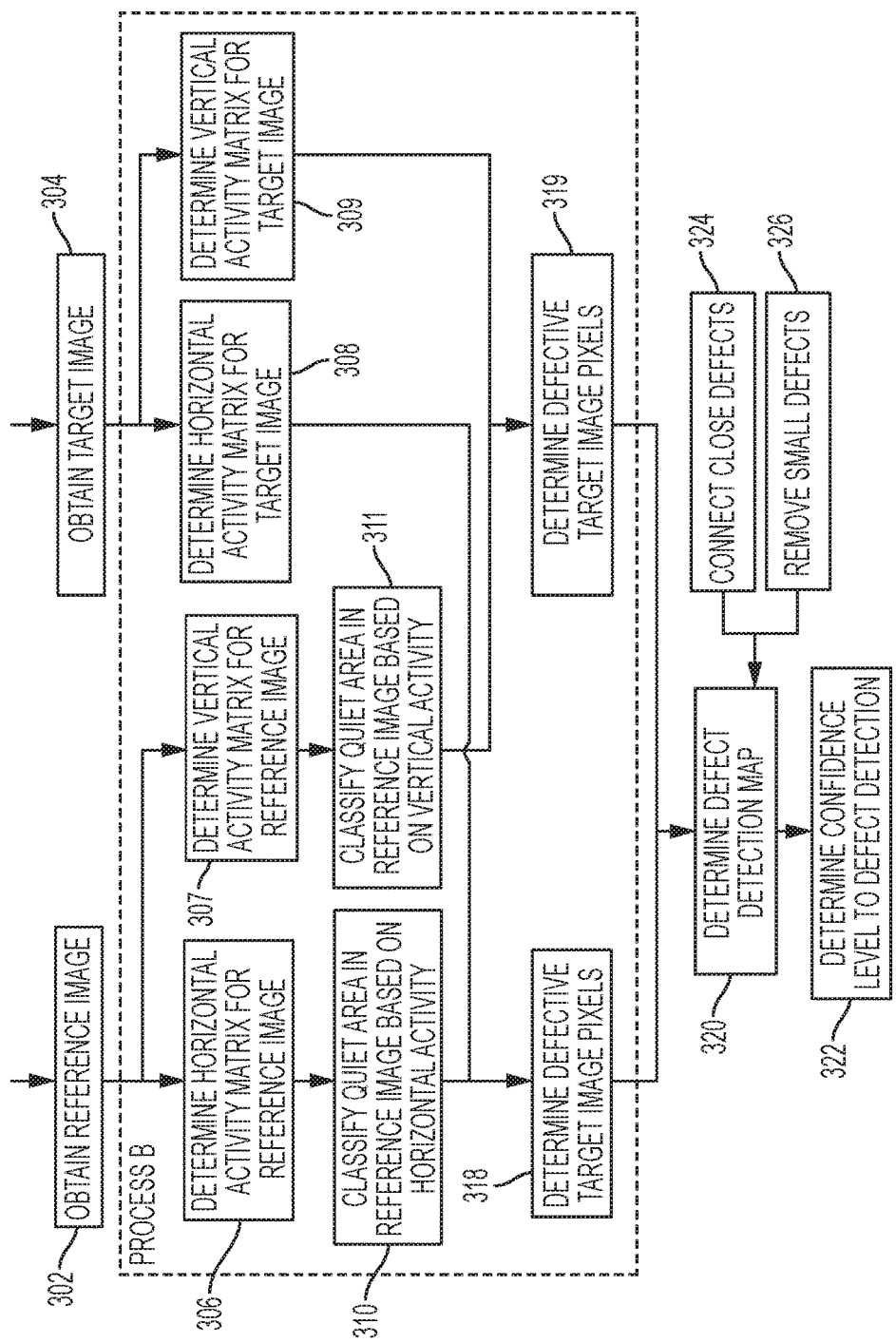
FIG. 3 depicts a diagram of a process of detecting defects in a print system based on horizontal and vertical activities according to various embodiments.

In FIG. 3, in some embodiments, the system may obtain reference image 302, and obtain target image 304 in a similar manner as that described in embodiments in FIG. 2. The system may look for image variations or smooth areas in the reference image or target image either horizontally or vertically, and determine a horizontal activity matrix 306, 307 and a vertical matrix 308, 309 for each of the reference image and the target image. The horizontal activity matrix includes the activity levels in horizontal direction for one or more pixels in the image, and the vertical activity matrix includes the activity levels in vertical direction. In some embodiments, the system may calculate the horizontal activity matrix of an image by applying a filter $F(x,y)$ to the image, where the filter runs in the horizontal direction only (e.g. a 1×M filter). Alternatively, and/or additionally, the system may calculate the vertical activity matrix of an image by applying a filter $F(x,y)$ to the image, where the filter runs in the vertical direction only (e.g. a M×1 filter).

As similar to embodiments described in FIG. 2, the filter $F(x,y)$ can be a standard deviation of the image at every pixel using a neighborhood around the pixel. The standard deviation pixel by pixel can be calculated using the variance calculation and/or a low-pass filter, such as a Rect filter.

Returning to FIG. 3, in some embodiments, the system may determine the horizontal activity matrix for the reference image 306 and determine the horizontal activity matrix for the target image 308. Additionally, the system may independently determine the vertical activity matrix for the reference image 307 and determine the vertical activity matrix for the target image 309. The system may use the same or different filters for reference image and target image.

Returning to FIG. 3, the system may use the horizontal activity matrix of the reference image to classify one or more pixels in the reference that corresponds to a quiet area (or no activity) 310. For the pixels in the reference image that are classified as corresponding to a quiet area, the system may use horizontal activity levels of the corresponding pixels in the target image to determine defective pixels in the target image 318, in a similar manner as that in the embodiments described in FIG. 2. Similarly, the system may use the vertical activity matrix of the reference image to classify one or more pixels in the reference that corresponds to a quiet area (or no activity) 311. For the pixels in the reference image that are classified as corresponding to a quiet area, the system may use vertical activity levels of the corresponding pixels in the target image to independently determine defective pixels in the target image 319.

In some embodiments, the system may determine a defect detection map 320 by combining the defective pixels in the target image that are classified as defective based on horizontal activity and those pixels that are classified as defective based on vertical activity. In some embodiments, the combination of defective pixels based on horizontal and vertical activities may be a union, i.e. the combined defect detection map includes all of the defective target image pixels that are classified via either horizontal or vertical process.

Similar to steps 210, 212 described in embodiments in FIG. 2, the system may optionally perform morphological operations to the activity matrices of the reference and target images. For example, the system may perform a dilation on the horizontal activity matrix and/or vertical activity matrix of the reference image and update the activity matrices before classifying the pixels in the reference image. In some embodiments, the system may perform a gray dilation on the activity matrix of the reference image. Alternatively, and/or additionally, the system may also perform gray erosion on the horizontal and/or vertical activity matrix of the target image and update the activity matrices of the target image before classifying the pixels in the target image. Although the activity matrix is either horizontal or vertical, the system may use a one-dimensional or two-dimensional structuring element to perform the morphological operations.

With further reference to FIG. 3, in similar embodiments as those described in FIG. 2, upon determining the defect detection map, the system may connect close defects 324 and/or remove small defects 326 in the defect detection map. In some embodiments, the system may connect one or more defective pixels in the defect detection map into one or more connected components. For example, the system may apply a morphological closing operation (dilation followed by erosion) on the defect detection map, which results in an updated defect detection map, in which detected defective areas that are close to each other are connected. The system may use a morphological opening (erosion followed by dilation) or other methods to remove small defects. In performing the morphological closing or opening, the dilation may use a structuring element of a size 20×20, whereas the erosion may use a structuring element of a size 11×11 or 13×13. In some embodiments, the morphological closing may be a binary operation when the defect detection map is binary. In similar embodiments as those described in FIG. 2, the system may also determine a confidence level for the defect detection map 322. The system may also display or report the defect detection result to the user.

Figure 4:
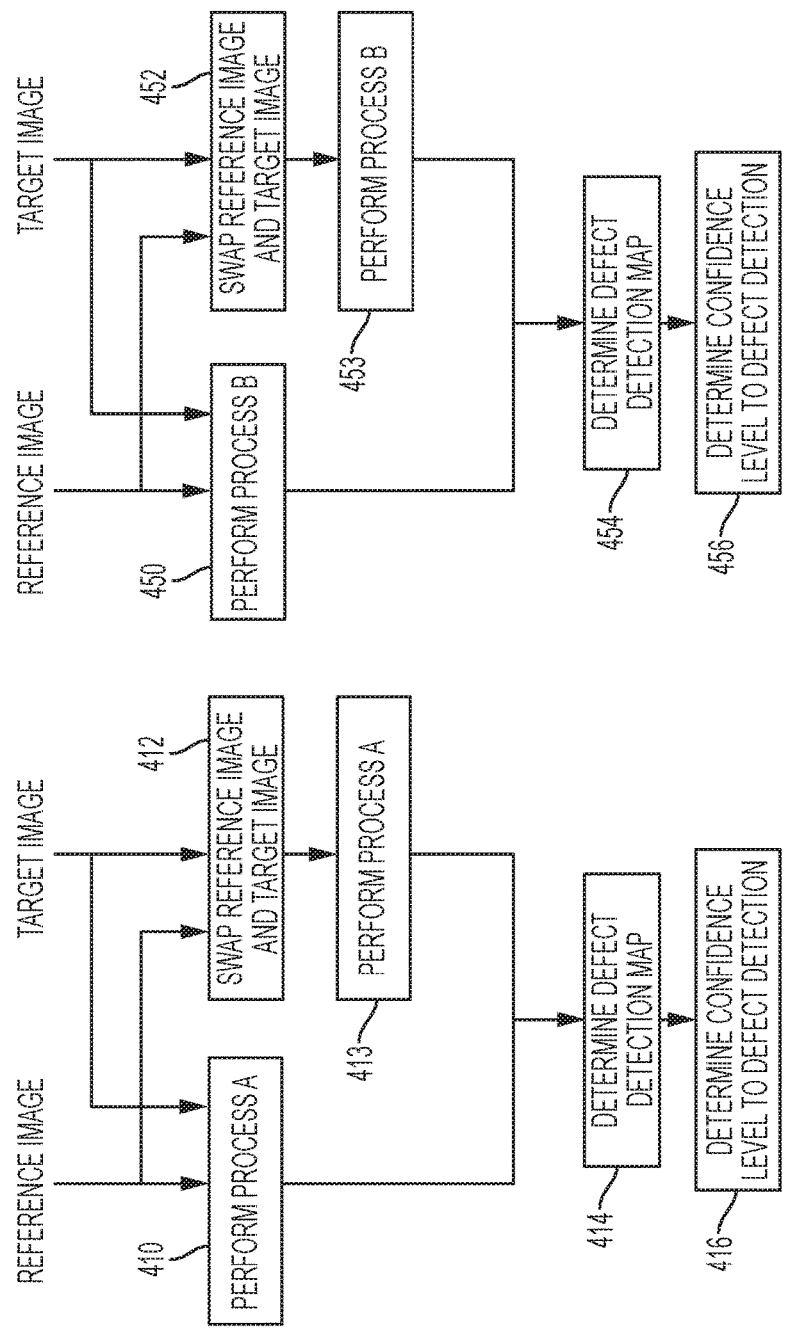
FIGS. 4A-4B depict a diagram of a process of detecting defects in a print system by swapping the reference image and the target image according to various embodiments.

In some embodiments, the system may perform variations of the illustrated embodiments in FIGS. 2 and 3. In some embodiments, the system may switch the reference and target images—this results in the system effectively looking for areas that are quiet in the printed image but not the reference image. This may effectively detect the defects, such as large area deletions, where the printer fails to print the desired image at all. As such, swapping the reference and target images may detect defects due to deletions in the print system. Alternatively, and/or additionally, the system may perform the steps in each of FIG. 2 and FIG. 3 with two passes, while swapping the reference image and the target image during the second pass, and combine the results from the two passes. This is further explained with reference to FIG. 4.

The system may be adapted from embodiments described in FIG. 2 such as process A. For example, in FIG. 4A, the system may perform the steps in process A (of FIG. 2) 410, swap the reference image and the target image 412, and re-perform process A with the swapped reference and target images 413, where each pass of process A will classify defective target image pixels. The system then combines the results from the two passes of process A to determine defect detection map 414. In some embodiments, the defect detection map includes all of the classified defective pixels in the target image from the two passes.

Alternatively, and/or additionally, the system may also be adapted from embodiments described in FIG. 3 such as process B. In FIG. 4B, the system may perform the steps in process B (of FIG. 3) 450, swap the reference image and the target image 452, and re-perform process B with the swapped reference and target images 453, where each pass of process B will classify defective target image pixels. The system then combines the results from the two passes of process A to determine defect detection map. In some embodiments, the defect detection map may include all of the classified defective pixels in the target image from the two passes. It is to be noted that in the second pass of process A (in FIG. 4A) or second pass of process B (in FIG. 4B), the classified defective pixels in the target image are actually corresponding to defective pixels in the original reference image, which will cover the scenarios in which deletions occur in a printed document.

Figure 5:
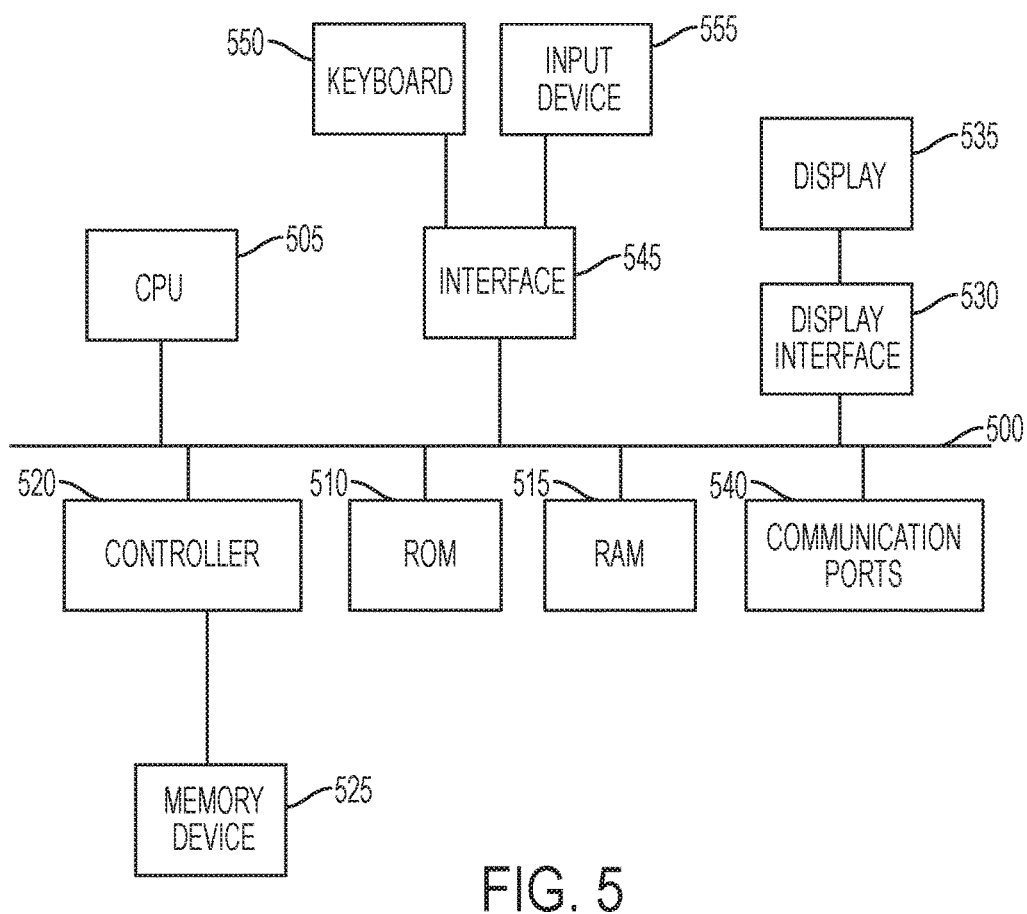
FIG. 5 depicts various embodiments of one or more electronic devices for implementing the various methods and processes described herein.

The above illustrated embodiments described in FIGS. 1-4 can be implemented in various configurations. For example, the system may implement these functions by a processing device of the print system, a processing device of an image system, a processing device of a remote server or a processing device on a cloud. FIG. 5 depicts an example of internal hardware that may be included in any of the electronic components of the system, such as the processing device. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors, whether a central processing unit (CPU) or a graphics processing unit (GPU) or a combination of the two. Read only memory (ROM), random access memory (RAM), flash memory, hard drives and other devices capable of storing electronic data constitute examples of memory devices 525. A memory device, also referred to as a computer-readable medium, may include a single device or a collection of devices across which data and/or instructions are stored.

An optional display interface 530 may permit information from the bus 500 to be displayed on a display device 535 in visual, graphic or alphanumeric format. An audio interface and audio output (such as a speaker) also may be provided. Communication with external devices may occur using various communication devices 540 such as a transmitter and/or receiver, antenna, an RFID tag and/or short-range or near-field communication circuitry. A communication device 540 may be attached to a communications network, such as the Internet, a local area network or a cellular telephone data network.

The hardware may also include a user interface sensor 545 that allows for receipt of data from input devices 550 such as a keyboard, a mouse, a joystick, a touchscreen, a remote control, a pointing device, a video input device and/or an audio input device. Digital image frames also may be received from an imaging capturing device 555 such as a scan bar positioned in a print system to capture a printed document while the electronic document is being printed.

Optionally, the hardware may not need to include a memory, but instead programming instructions are running on one or more virtual machines or one or more containers on a cloud. For example, the processing device 102 (in FIG. 1) may be a server on a cloud that includes multiple virtual machines, each virtual machine having an OS, a virtual disk, virtual network and Apps, and the programming instructions for implementing various functions in the print system may be stored on one or more of those virtual machines on the cloud.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A system for detecting defects in a print system, comprising:
   a print engine configured to print a first electronic document to yield a printed document;
   an image sensor configured to scan the printed document into a second electronic document;
   a processing device; and
   a non-transitory, computer-readable medium containing programming instructions that are configured to cause the processing device to:
   (i) obtain a reference image comprising content of a page of the first electronic document,
   (ii) obtain a target image comprising content of a page of the second electronic document,
   (iii) analyze the reference image to determine a first activity matrix comprising activity levels for a plurality of pixels of the reference image, (iv) analyze the target image to determine a second activity matrix comprising activity levels for a plurality of pixels in the target image,
(v) use the first activity matrix to classify one or more pixels in the reference image as corresponding to a quiet area, wherein the quiet area denotes an area in which a pixel and its neighboring pixels exhibit less than a threshold level of activity,
(vi) for at least a first subset of the pixels in the reference image that correspond to the quiet area, compare each pixel in the first subset to a corresponding pixel in the target image to determine whether a difference between the activity level of each pixel in the first subset and the activity level of the corresponding pixel in the target image exceeds a noise threshold, and
(vii) for any reference image pixel and corresponding target image pixel for which the difference of activity level exceeds the noise threshold, classify that target image pixel as defective.

2. The system of claim 1, further comprising additional programming instructions configured to cause the processing device to determine a defect detection map that comprises each of the target image pixels that were classified as defective.

3. The system of claim 1, wherein:
the programming instructions for determining the first activity matrix comprise programming instructions configured to cause the processing device to calculate a standard deviation for each of the pixels in the reference image using a first low-pass filter; and
the programming instructions for determining the second activity matrix comprise programming instructions configured to cause the processing device to calculate a standard deviation for each of the pixels in the target image using a second low-pass filter.

4. The system of claim 1, wherein:
the programming instructions for classifying the one or more pixels in the reference image as corresponding to a quiet area comprise programming instructions configured to cause the processing device to determine that the activity levels of the one or more pixels in the reference image are below a first threshold; and
the programming instructions for determining that the difference of activity level exceeds the noise threshold comprise programming instructions configured to cause the processing device to determine that:
the activity level of each corresponding pixel in the target image is above a first threshold, and
a ratio of the activity level of each corresponding pixel in the target image over the activity level of each pixel of the first subset in the reference image is above a second threshold.

5. The system of claim 1, further comprising additional programming instructions configured to cause the processing device to:
perform a morphological dilation on the first activity matrix to update the first activity matrix before classifying the pixels in the reference image; and
perform a morphological erosion on the second activity matrix to update the second activity matrix before classifying the pixels in the target image.

6. The system of claim 2, further comprising additional programming instructions configured to cause the processing device to connect one or more defective pixels in the defect detection map into one or more connected components.

7. The system of claim 6, further comprising additional programming instructions configured to cause the processing device to:
identify from the one or more connected components in the defect detection map a largest connected component; and
determine a confidence level to defect detection based on a size of the largest connected component.

8. The system of claim 2, further comprising additional programming instructions configured to cause the processing device to:
swap the content of the page in the reference image and the content of the page in the target image;
repeat the steps (iii) to (vii); and
update the defect detection map to additionally include all of the target image pixels that were classified as defective in repeating the steps (iii) to (vii).

9. The system of claim 1, wherein:
the first activity matrix is a horizontal activity matrix comprising horizontal activity levels for the plurality of pixels of the reference image;
the second activity matrix is a horizontal activity matrix comprising horizontal activity levels for the plurality of pixels in the target image;
the programming instructions are also configured to cause the processing device to:
(viii) analyze the reference image to determine a first vertical activity matrix comprising vertical activity levels for a plurality of pixels of the reference image,
(ix) analyze the target image to determine a second vertical activity matrix comprising vertical activity levels for a plurality of pixels in the target image,
(x) use the first vertical activity matrix to classify one or more pixels in the reference image, based on their activity levels, as corresponding to a variation area,
(xi) for at least a second subset of pixels in the reference image that correspond to the variation area, compare each pixel in the second subset to a corresponding pixel in the target image to determine whether a difference between the vertical activity level of each pixel in the second subset and the vertical activity level of the corresponding pixel in the target image exceeds a noise threshold,
(xii) for any reference image pixel and corresponding target image pixel, for which the difference of vertical activity level exceeds the noise threshold, classify that target image pixel as defective, and
(xiii) determine a defect detection map that comprises all of the target image pixels that were classified as defective in steps (vii) and (xii).

10. The system of claim 9, further comprising additional programming instructions configured to cause the processing device to connect one or more defective pixels in the defect detection map into one or more connected components.

11. The system of claim 10, further comprising additional programming instructions configured to cause the processing device to:
identify from the one or more connected components in the defect detection map a largest connected component; and
determine a confidence level to defect detection based on a size of the largest connected component.

12. The system of claim 9, further comprising additional programming instructions configured to cause the processing device to:
- swap the content of the page in the reference image and the content of the page in the target image;
- repeat the steps (iii) to (xii); and
- update the defect detection map to additionally include all of the target image pixels that were classified as defective in repeating the steps (iii) to (xii).

13. A method of detecting defects in a print system, comprising:
- (i) obtaining, by a processing device, a reference image comprising content of a page of a first electronic document;
- (ii) scanning, by the processing device, a printed document of the first electronic document into a target image;
- (iii) analyzing, by the processing device, the reference image to determine a first activity matrix comprising activity levels for a plurality of pixels of the reference image;
- (iv) analyzing, by the processing device, the target image to determine a second activity matrix comprising activity levels for a plurality of pixels in the target image;
- (v) using, by the processing device, the first activity matrix to classify one or more pixels in the reference image as corresponding to a quiet area, wherein the quiet area denotes an area in which a pixel and its neighboring pixels exhibit less than a threshold level of activity;
- (vi) for at least a first subset of the pixels in the reference image that correspond to the quiet area, comparing, by the processing device, each pixel in the first subset to a corresponding pixel in the target image to determine whether a difference between the activity level of each pixel in the first subset and the activity level of the corresponding pixel in the target image exceeds a noise threshold; and
- (vii) for any reference image pixel and corresponding target image pixel, for which the difference of activity level exceeds the noise threshold, classifying that target image pixel as defective.

14. The method of claim 13, further comprising determining a defect detection map that comprises each of the target image pixels that were classified as defective.

15. The method of claim 13, wherein:
- determining the first activity matrix comprises calculating a standard deviation for each of the pixels in the reference image using a first low-pass filter; and
- determining the second activity matrix comprises calculating a standard deviation for each of the pixels in the target image using a second low-pass filter.

16. The method of claim 13, wherein the first low-pass and the second low-pass filters are a two-dimensional window comprising a plurality of coefficients having equal values.

17. The method of claim 13, wherein classifying the one or more pixels in the reference image as corresponding to a quiet area comprises determining that the activity levels of the one or more pixels in the reference image are below a first threshold; and
determining that the difference of activity level exceeds the noise threshold comprises determining that:
- the activity level of each corresponding pixel in the target image is above a first threshold, and
- a ratio of the activity level of each corresponding pixel in the target image over the activity level of each pixel of the subset in the reference image is above a second threshold.

18. The method of claim 13, further comprising:
- performing, by the processing device, a morphological dilation on the first activity matrix to update the first activity matrix before classifying the pixels in the reference image; and
- performing, by the processing device, a morphological erosion on the second activity matrix to update the second activity matrix before classifying the pixels in the target image.

19. The method of claim 18, wherein the morphological dilation is a gray-scale dilation and the morphological erosion is a gray-scale erosion.

20. The method of claim 14, further comprising connecting one or more defective pixels in the defect detection map into one or more connected components.

21. The method of claim 20, wherein connecting the one or more defective pixels in the defect detection map comprises performing a morphological closing on the defect detection map.

22. The method of claim 20, further comprising performing, by the processing device, a morphological opening on the defect detection map.

23. The method of claim 20, further comprising, by the processing device:
- identifying from the one or more connected components in the defect detection map a largest connected component; and
- determining a confidence level to defect detection based on a size of the largest connected component.

24. The method of claim 14, further comprising, by the processing device:
- swapping the content of the page in the reference image and the content of the page in the target image;
- repeating the steps (iii) to (vii); and
- updating the defect detection map to additionally include all of the target image pixels that were classified as defective in repeating the steps (iii) to (vii).

25. The method of claim 13, wherein the first activity matrix is a horizontal activity matrix that includes horizontal activity levels for the plurality of pixels of the reference image and the second activity matrix is a horizontal activity matrix that includes horizontal activity levels for the plurality of pixels of the target image, the method further comprising:
- (viii) analyzing, by the processing device, the reference image to determine a first vertical activity matrix comprising vertical activity levels for a plurality of pixels of the reference image;
- (ix) analyzing, by the processing device, the target image to determine a second vertical activity matrix comprising vertical activity levels for a plurality of pixels in the target image;
- (x) using, by the processing device, the first vertical activity matrix to classify one or more pixels in the reference image, based on their activity levels, as corresponding to a variation area;
- (xi) for at least a second subset of pixels in the reference image that correspond to the variation area, comparing, by the processing device, each pixel in the second subset of the pixels to a corresponding pixel in the target image to determine whether a difference between the vertical activity level of each pixel in the second subset and the vertical activity level of the corresponding pixel in the target image exceeds a noise threshold;

(xii) for any reference image pixel and corresponding target image pixel for which the difference of vertical activity level exceeds the noise threshold, classifying that target image pixel as defective; and (xiii) determining, by the processing device, a defect detection map that comprises all of the target image pixels that were classified as defective in the steps (vii) and (xii).

26. The method of claim 25, further comprising connecting one or more defective pixels in the defect detection map into one or more connected components.

27. The method of claim 26, further comprising:
identifying, by the processing device, from the one or more connected components in the defect detection map a largest connected component; and
determining, by the processing device, a confidence level to defect detection based on a size of the largest connected component.

28. The method of claim 25, further comprising:
swapping, by the processing device, the content of the page in the reference image and the content of the page in the target image;
repeating, by the processing device, the steps (iii) to (xii); and
updating, by the processing device, the defect detection map to additionally include all of the target image pixels that were classified as defective in repeating the steps (iii) to (xii).

* * * * *